United States Patent [19]
Magdaleno

[11] Patent Number: 5,375,036
[45] Date of Patent: Dec. 20, 1994

[54] CURRENT TRANSFER BUS AND ASSEMBLY
[75] Inventor: Jose L. Magdaleno, Dallas, Tex.
[73] Assignee: AT&T Corp., Murray Hill, N.J.
[21] Appl. No.: 82,195
[22] Filed: Jun. 24, 1993
[51] Int. Cl.⁵ ............................................. H02B 1/20
[52] U.S. Cl. ................................. 361/673; 174/70 B;
174/133 B; 200/289; 361/640; 361/676;
439/212; 439/485
[58] Field of Search ............... 361/611, 614, 637–639,
361/640, 648, 656, 673, 675, 676; 174/68.2, 70
B, 129 B, 133 B; 439/212–214, 723, 485, 487;
200/289

[56] References Cited
U.S. PATENT DOCUMENTS

| | | | |
|---|---|---|---|
| 2,969,421 | 1/1961 | Scott, Jr. | 174/133 B |
| 3,728,585 | 4/1973 | Olashaw | 174/133 B |
| 3,851,130 | 11/1974 | Paulson | 200/289 |
| 3,998,306 | 12/1976 | Howell, Jr. | 191/23 R |
| 4,366,528 | 12/1982 | Cole | 361/429 |
| 4,419,715 | 12/1983 | Pear | 174/133 B |
| 4,528,614 | 7/1985 | Shariff | 361/379 |

Primary Examiner—Gerald P. Tolin
Attorney, Agent, or Firm—Ruloff F. Kip, Jr.

[57] ABSTRACT

A circuit breaker has a line terminal comprising a pair of vertically spaced resilient terminal strips which extend in the transverse horizontal direction out from the breaker's housing to free ends of the strips, and which strips have formed therein near those ends respective bends disposed opposite each other and vertically projecting away from each other to bound opposite sides of a circular cylindrical cavity defined between those strips. A horizontal rail for conducting current is aligned in its lengthwise direction normal to those strips, and the rail has a flange received in the cavity in electromechanical contact with the strips, and also, a web extending in the transverse horizontal direction from the front flange out beyond the terminal to a rear flange for the rail. The shape, size and mass of the rail promote reduction of the temperature generated at the line terminal by the inrush of current carried by the rail in the presence of a short circuit in the load served by the breaker.

7 Claims, 2 Drawing Sheets

CURRENT TRANSFER BUS AND ASSEMBLY

FIELD OF THE INVENTION

This invention relates to means for transferring electric power from a source to a load aid for selectively interrupting such transfer of power.

BACKGROUND OF THE INVENTION

In telephone network central offices and other places served by electricity, electric power is supplied to equipment energized thereby through circuit protection boards comprising circuit breakers and current conductors between which such circuit breakers are coupled to be interposed by such conductors between a power source and the electrical load provided by such equipment. Customarily, the circuit breakers were connected to such conductors by the time consuming and labor intensive (and thus costly) practice of bolting the terminals of the breakers and the conductors together. More recently, there have come into use circuit protection boards in which, as an alternative to bolting, the circuit breaker terminals and the mentioned conductors are cooperable to permit the incorporation of a circuit breaker into the board by, in effect, merely plugging in the breaker. Up to now, however, a problem in the use of such plug-in technique has been that, in the event of an inrush of current to the circuit breaker caused by a short circuit in the load, the heat generated at the place of contact between the circuit breaker and the input conductor has not been dissipated as efficiently as is desirable so as to cause an unduly high temperature at that place of contact.

SUMMARY OF THE INVENTION

The problem just mentioned has been overcome according to the invention by a current transfer bus and an assemblage of such bus and a circuit breaker, which bus and assemblage are of the character set out by the appended claims.

DETAILED DESCRIPTION OF DRAWINGS

For a better understanding of the invention, reference is made to the following description of an exemplary embodiment thereof, and to the accompanying drawings wherein.

Figure 1:
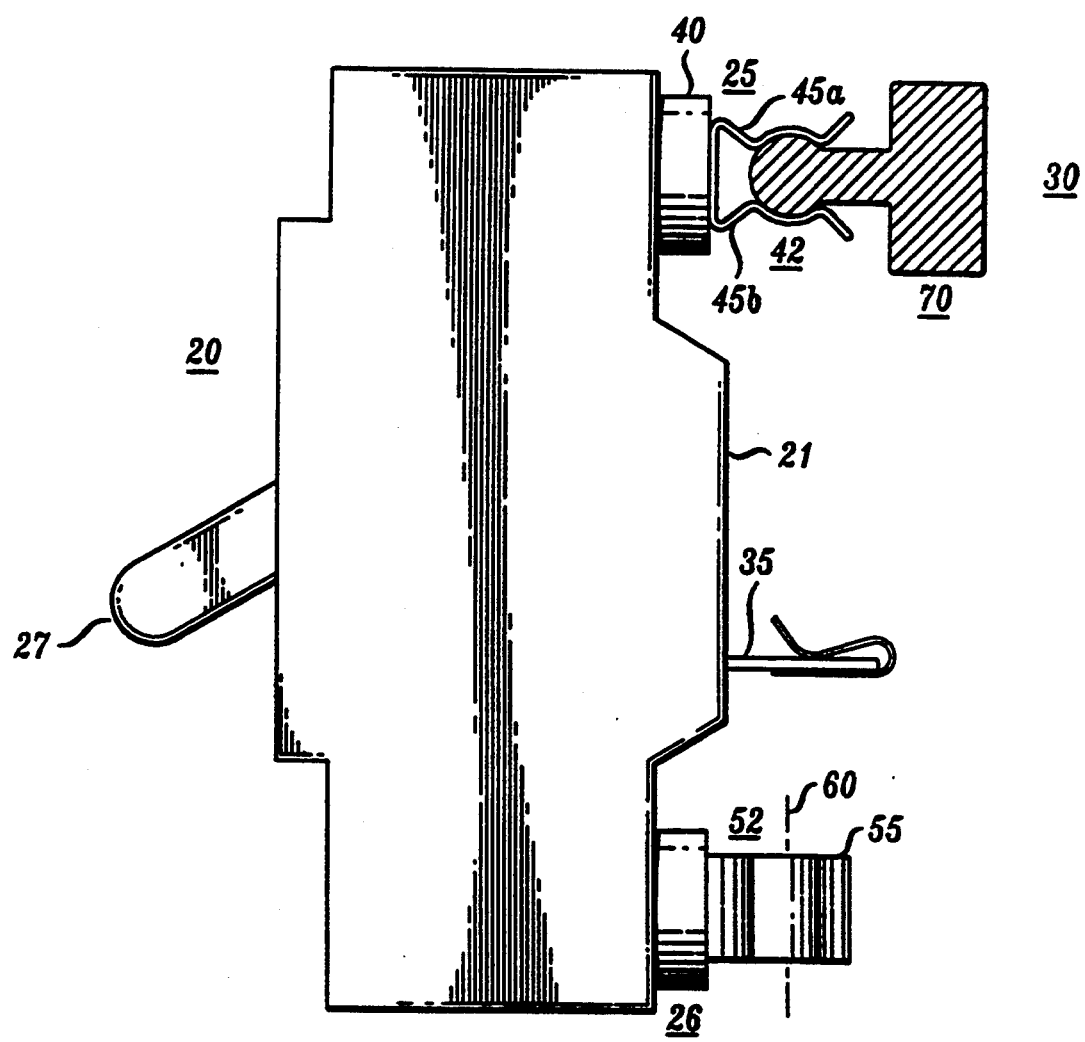
FIG. 1 is a front elevation of the assemblage of a circuit breaker and a current transfer bus according to the invention, the bus being shown in vertical cross-section taken as indicated by the arrows 1—1 in FIG. 4.

In the description which follows, various elements shown in the drawings will be described in terms of horizontal and vertical dimensional coordinates, but it is to be understood that the invention hereof is not, either as disclosed or claimed, limited by any recital herein of its spatial orientation.

DETAILED DESCRIPTION OF EMBODIMENT

Referring to FIG. 1, the reference numeral 10 designates an assemblage for selectively interrupting transfer of electric current. Assemblage 10 comprises a circuit breaker 20 and a bus 30 for supplying electric current to breaker 20 from a current source which may be, for example without restriction, a battery plant.

The circuit breaker 20 has a plastic housing 21, an upper or "line" terminal 25 for receiving current via bus 30 from the mentioned source, and a lower or "load" terminal 26 for transmitting electric current passing through the breaker to an electric load comprising equipment energized by electric power and serviced by breaker 20.

Breaker 20 also includes an angularly movable push button 27 connected to a switch (not shown) in the breaker's interior. Button 27 is manually movable between a down or "off position" and an up or "on position" at which such switch opens and closes, respectively, in a current path in the breaker between terminals 25 and 26 to thereby interrupt and restore, respectively, flow through the breaker of current from bus 30. In the event a short circuit develops in the electrical load served by the breaker, the resulting inrush of current from bus 30 through the breaker actuates conventional mechanism therein (not shown) which drives the mentioned switch from closed to open position (and concurrently, push button 27 from up to down position) so as to interrupt the current flow through breaker 20 until such switch is reclosed by resetting of button 27.

The breaker 20 also includes an alarm device 35 which produces an audible or visual alarm upon occurrence of a short circuit in the circuit breaker load.

Figure 2:
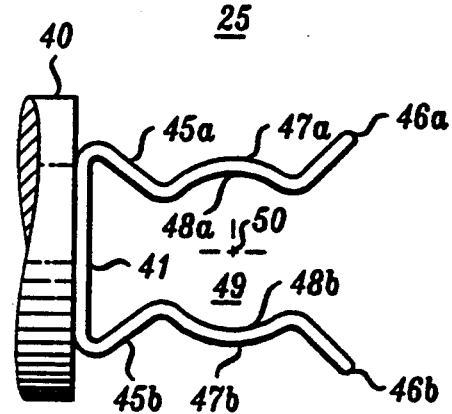
FIG. 2 is an enlarged front elevation view of the upper terminal of the FIG. 1 circuit breaker.

Referring now to FIG. 2, the upper or "line" terminal 25 is of a type known as a "ferrule" terminal. Terminal 25 comprises a metallic cylindrical base 40 extending leftward inside housing 21 to the breaker mechanism therein, and projecting rightward out through an aperture in the housing. The front end of base 40 has thereon the shank portion 41 of a copper clip 42 fixedly joined to the base as, say, by a rivet (not shown) passing through the shank 41 into the base 40.

Other portions of clip 42 are a pair of vertically spaced resilient metallic terminal strips 45a, 45b integrally joined to vertically opposite ends of the clip shank 41 and extending from such joinders horizontally away from the housing 21 of the circuit breaker 20. At an intermediate location in their horizontal extents, the strips have formed therein, near their free ends 46, respective bow-shaped bends or inflections 47a, 47b, beyond which the strips flare outwardly from each other to those free ends. The inflections 47 are disposed vertically opposite each other, project away from each other and have respective inner surfaces 48a, 48b bounding opposite sides of a receptacle space or cavity 49 defined between the strips 45 and having an axis 50. Such axis is, in the case of upper terminal 25, a horizontal axis normal to the horizontal extent of the terminal strips 45. The inner surfaces 48 of the inflections 47 are preferably circular cylindrical surfaces which conform to surface areas of a geometric circular cylinder containing cavity 49 and having axis 50 as its axis.

The lower terminal 26 of breaker 20 is similar in construction to the upper terminal 25 except that, in the lower terminal, the clip 52 is rotated 90° in relation to the corresponding clip 42 in terminal 25. The result is that the terminal strips 55 of terminal 26 are spaced apart horizontally so that the receptacle space defined between those strips has a vertical axis 60.

Figure 3:
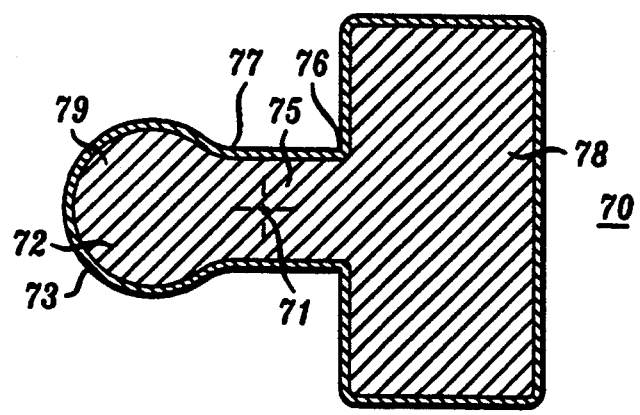
FIG. 3 is an enlarged view of the cross-section shown in FIG. 1 of the current transfer bus.
Figure 4:
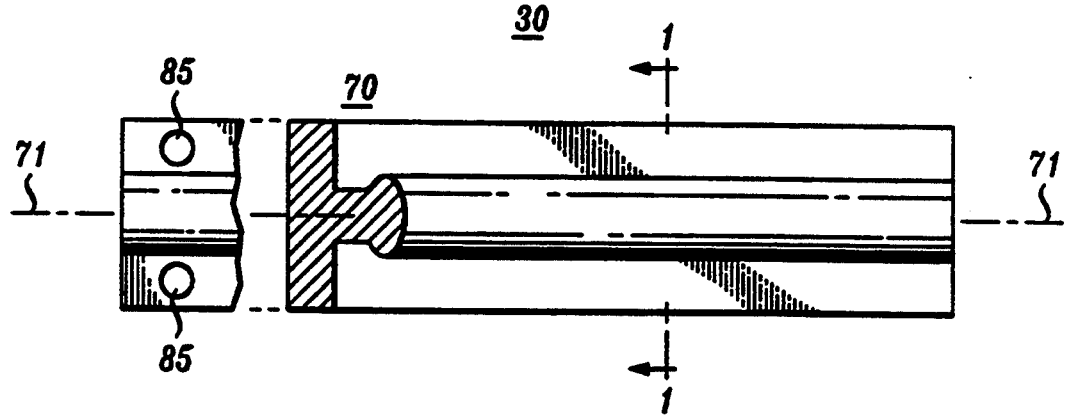
FIG. 4 is a right side elevation of the FIG. 1 bus, shown as being partly broken away, with a cross-section on the diagonal being taken through bus at the break away location.

Coming now to the current transfer bus 30, shown standing alone in FIGS. 3 and 4, such bus comprises an elongated linear metallic extruded rigid rail 70 having a lengthwise horizontal axis 71 along which the rail extends. Axis 71 is parallel with the cavity axis 50 (FIG. 2) when the bus is assembled (FIG. 1) with the circuit breaker 20. The rail in its interior is (FIG. 3) constituted solidly of copper 72 but has on its outside a coating 73 (FIG. 3) of an antioxidant material such as a tin solder coating.

Structurally speaking, the rail 70 comprises an elongated horizontal web 75 having rear and front margins 76 and 77 on horizontally opposite sides of axis 71, and having also rear and front vertical flanges 78 and 79 integrally joined with the web 75 at, respectively, the rear margin 76 and the front margin 77 of the web. The rear flange 78 is rectangular in vertical cross-section and is salient in both of the vertical directions (i.e., the "up" and "down" directions) away from the web 75 with which it is joined, and can aptly be described as a "flat" (albeit thick) web. In contrast, the front flange 79 has in vertical planes a cross-sectional shape which is rounded in outline and protuberant in both vertical directions away from web 75. That is, the front flange 79 and the front part of web 75 in vertical cross-section have a bulbous shape.

The entire rail, 70 consisting of web 75 and flanges 78, 79 has an exterior circumferential surface which is a cylindrical surface, formed about axis 71, so that the rail is constant in size and shape in vertical cross section over the horizontal length of the rail. That cylindrical surface is, for the most part, non-circular but the portion of that surface which forms the exterior of front flange 79 is preferably a circular cylindrical surface 80 having the same radius as the circular cylindrical inner surfaces 48 of the terminal strips 45 of circuit breaker terminal 25.

Continuing with a comparison of the rail's rear and front flanges 78 and 79, it will be noted that the vertical cross section of that rear flange has a substantially greater area than that of the front flange to thereby contain much more mass per unit length of rail than does the front flange. One of the ways in which rear flange 78 accommodates more mass than per unit length than does the front flange 79 is that the rear flange has a greater vertical dimension than does the front flange. Moreover, proportioning the design of the rear flange relative to that of the front flange in the direction of increasing the vertical dimension of flange 78 in relation to flange 79 provides the additional advantage that, assuming that for some reason it is necessary for the mass per unit length in flange 78 to be maintained in fixed proportion to the mass per unit length in flange 79, nonetheless, by increasing the vertical dimension of flange 78 while concurrently shrinking its horizontal thickness to maintain constant its mass per unit length, it is possible to increase as desired the surface area per unit length of flange 78 relative to its mass per unit length. To so increase the surface area of flange 78 is advantageous as later discussed. That the surface area per unit length of flange 78 can be increased as desired relative to its mass per unit rail length (here, for convenience, assumed constant) flows from the geometric consideration that, in the case of a cylindrical body (and flange 78 is a cylindrical body) the minimum ratio for the circumferential surface area to the volume of the body is obtained when the body is a circular cylindrical body, and the value of that ratio increase as one departs from that cylindrical shape to its being one in the form of a very thin cylindrical shell having an infinitesimal thickness between opposite sides of the shell.

Referring to FIG. 4, the rail 70 at its left hand end has vertical holes 85 formed in its rear flange 78 on opposite sides of the web 75. The holes 85 are for passage therethrough of bolts (not shown) for connecting the rail to, say, an end lug on a cable leading to the source (as, say, a battery plant) from which the rail draws its current.

Returning now to the assemblage shown in FIG. 1, assume that initially the circuit breaker 20 and bus 30 are horizontally spaced with the bus 30 being held stationary by means (not shown) in relation to a circuit protection board (not shown) with which the elements 20, 30 are associated. To create the assemblage 20, 30 the breaker 20 is moved rightward to cause the flange 79 of rail 70 to be relatively forced leftward through the flaring entrance of the circuit breakers line terminal 25 and to become lodged in the cavity 49 between the resilient terminal strips of that terminal. When the rail flange 79 becomes so lodged, the terminal strips press against it from opposite sides, and since the circular cylindrical outside surface of the flange has the same radius as the circular cylindrical inner surfaces 48 of the inflections 47 formed in the terminal strips 45, those inner surfaces over their arcuate extents make areal contact with the opposite sides of the flange 79.

The areal contacts under pressure between the strips 47 and the rail flange 79 serve both to electromechanically connect the whole rail 70 to the circuit breaker terminal 25 and to retain that upper terminal mechanically clipped to the rail 70. Concurrently, the resilient metallic terminal strips 55 of the lower circuit breaker terminal 26 make areal contacts under pressure with opposite sides of a short round vertical metallic rod (not shown) held stationary by means (not shown) in relation to the mentioned circuit protection board so as, by such areal pressure contacts, both to electromechanically connect the lower breaker terminal to that rod and to retain the lower terminal clipped to such rod. In this way, the circuit breaker 20 is "plugged in" to the mentioned board.

Operation of Embodiment

So long as there is no short circuit in the load served by breaker 20, electric current supplied to the breaker 30 passes uninterruptedly through the breaker to the load. The occurrence, however, of such a short circuit produces an inrush of current from the bus into the breaker and a resulting opening of the breaker which remains open until the short circuit has been removed and the breaker has been reset.

A consequence of such inrush is that a great deal of heat is generated at and in the vicinity of the contacts made between the strips 45 of breaker terminal 25 and the portion of the bus 30 occupying the receptacle 49 defined between those strips. Prior to the invention hereof, the bus took the form of an elongated circular cylindrical rod having the same radius as the circular cylindrical inner surfaces of the strips 45. When, however, the bus had such rod form, the rod was relatively small in cross section and extended from the breaker terminal 25 only in the lengthwise direction through the terminal strips. The previous rod shaped bus afforded very little mass to serve as a heat sink for the mentioned heat and, moreover, afforded a path for dissipation of such heat only in the rod's lengthwise direction.

In contrast, the bus 30 comprising the rail 70 disclosed herein has a mass per unit length which, because of the presence of its web 75 and rear flange 78 in addition to its front flange 79 (the part of rail 70 analogous to the prior circular rod bus), is substantially greater than that of the earlier used bus and can be increased indefinitely by merely adding to the mass per unit length of the rear flange 78. Further, heat generated at and in the vicinity of the contacts made between the terminal strips 45 and the bus can now flow from where the heat is first generated not only in the lengthwise horizontal direction through the bus but also in the case of rail 70, in the transverse horizontal direction from front flange 79 through web 75 to web 78 and the large mass provided thereby. A still further factor in improving the dissipation of heat away from its place of generation at and near the contacts between breaker terminal 25 and the bus, is that rail 70 has much greater surface area per unit length than did the earlier rod shaped bus to thereby provide better dissipation of such heat by its radiation into the atmosphere and, as earlier discussed, such surface area of the rail can be increased as desired by modifying the design of its rear flange 78 to make it progressively thinner in relation to a fixed area in vertical cross-section of the flange.

Because the described rail 70 is a much more efficient heat dissipator, for all the reasons set out above, then was the earlier rod shaped bus, the use of rail 70 in the FIG. 1 assemblage in place of that earlier bus serves to keep at an acceptably low value the temperature generated at the line terminal 25 of the breaker 20 in the presence of a short circuit in the load served the by breaker. To put it another way, when it is given as a requirement that the temperature generated at such line terminal must not exceed a pre-established value (and such is a requirement in the commercial design of circuit protection boards) then the use of a bus having the configuration of rail 70, rather than the earlier circular rod configuration, permits a line terminal of given size for a circuit breaker to receive a much greater amperage of inrush current while still meeting such requirement.

In general, moreover, the size of circuit breakers as a whole are in proportion to the size of their terminals. It follows that, when buses of the configuration of rail 70 are used in circuit protection boards in place of the earlier circular rod buses it is a fact, as a general proposition and by redesign of the circuit breakers, that the short circuit amperage handled by the circuit breakers can be increased for each from, say, 30 amperes to, say, 100 amperes without having to increase the size of the breaker. In those same circumstances, it is conversely the fact, as a general proposition and by redesign of the circuit breakers, that if the short circuit amperage to be handled by the circuit breakers plugged into the board has an upper value such as, say, 30 amperes, then, by use of input buses having configuration of rail 70 rather than the former circular rod configuration, the size of the circuit breakers needed for the board can be reduced, say, three fold.

The above described embodiment being exemplary only, it is to be understood that additions thereto omissions therefrom and modifications thereof can be made without departing from the spirit of the invention. For example, while the invention has been described in the terms of circuit breaker-input bus assemblages used in circuit protection boards interposed between loads and current sources which are battery plants used, say, to provide standby power in telephone network central offices, the invention is also of application where the boards are used to distribute AC power in residential and commercial fuse and circuit breaker distribution systems. Accordingly, the invention is not to be considered as limited save as is consonant with the recitals of the following claims.

I claim:

1. An assemblage for selectively interrupting transfer of electric current, said assemblage comprising, a circuit breaker having a housing and a pair of terminals for current supplied to and drawn from said breaker, at least a first of said terminals comprising a pair of vertically spaced resilient metallic terminal strips extending horizontally from said housing to free ends of said strips, said strips having respective bow-shaped inflections which are formed in said strips near said ends so that said inflections vertically project away from each other, said inflections having respective inner surfaces bounding opposite sides of a receptacle cavity defined between said strips by said inflections, and a current transfer bus comprising, a metallic rail having a lengthwise axis and extending horizontally along said axis normal to the horizontal extent of said terminal strips, said rail comprising an elongated central horizontal web having rear and front margins on horizontally opposite sides of said axis, and said rail also comprising rear and front vertically salient flanges integrally joined with said web at, respectively, said rear and front margins thereof, said front flange having in the vertical plane a cross-sectional shape which is of rounded outline and protuberant in both vertical directions from said web, and said front flange being received in said cavity to make respective areal contacts on opposite sides of such flange with said inner surfaces of said terminal strips, said web projecting in the horizontal transverse direction away from said front flange outwardly beyond said free ends of said terminal strips, and said rear flange being horizontally spaced away from said free ends.

2. A bus according to claim 1 in which said front flange of said rail has a cylindrical outer surface.

3. A bus according to claim 1 in which said rear flange of said rail has in vertical cross-section an area greater than that of said front flange.

4. A bus according to claim 3 in which said rear flange is salient from said web in both vertical directions, and in which the vertical dimension of said rear flange is greater than that of said front flange.

5. A bus according to claim 1 in which said bus along its horizontal extent is of constant vertical cross-section in both size and shape.

6. A bus according to claim 1 in which the interior of said bus is copper.

7. A bus according to claim 6 in which said copper of said rail has thereon a coating of metallic anti-oxidant material.

* * * * *